United States Patent
Enomoto

(10) Patent No.: US 6,353,507 B1
(45) Date of Patent: Mar. 5, 2002

(54) ZOOM LENS SYSTEMS

(75) Inventor: Takashi Enomoto, Chiba (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,355

(22) Filed: Dec. 22, 1999

(30) Foreign Application Priority Data

Dec. 24, 1998 (JP) ............................................ 10-368173

(51) Int. Cl.[7] ................................................ G02B 15/14
(52) U.S. Cl. ........................ 359/689; 359/680; 359/682; 359/784
(58) Field of Search ............................... 359/680, 682, 359/689, 784

(56) References Cited

U.S. PATENT DOCUMENTS

| | | | |
|---|---|---|---|
| 4,196,969 A | 4/1980 | Itoh | 359/680 |
| 4,813,773 A | 3/1989 | Minefuji | 359/679 |
| 5,175,648 A | * 12/1992 | Mori | 359/689 |
| 5,270,866 A | 12/1993 | Oizumi et al. | 359/689 |
| 5,455,714 A | 10/1995 | Kohno | 359/689 |
| 5,574,599 A | 11/1996 | Hoshi et al. | 359/689 |
| 6,028,716 A | * 2/2000 | Kato et al. | 359/689 |

FOREIGN PATENT DOCUMENTS

| | | | | |
|---|---|---|---|---|
| JP | 60-188918 | * | 9/1985 | 359/784 |
| JP | 62-194214 | * | 8/1987 | 359/784 |
| JP | 1-163716 | * | 6/1989 | 359/689 |
| JP | 5-93865 | * | 4/1993 | 359/689 |
| JP | 5-93866 | * | 4/1993 | 359/689 |
| JP | 5-113539 | * | 5/1993 | 359/689 |
| JP | 5-157969 | * | 6/1993 | 359/689 |
| JP | 5-173072 | * | 7/1993 | 359/689 |
| JP | 6-82697 | * | 3/1994 | 359/689 |
| JP | 6-21458 | * | 8/1994 | 359/689 |

* cited by examiner

Primary Examiner—Evelyn A. Lester
(74) Attorney, Agent, or Firm—Greenblum & Bernstein, P.L.C.

(57) ABSTRACT

A zoom lens system including a negative first lens group, a positive second lens group, and a negative third lens group, in this order from the object, and thereby zooming is performed by moving the first through third lens groups along the optical axis. The zoom lens system satisfies the following condition:

$$0.05 < d_{12}w/fw < 0.35 \tag{1}$$

wherein $d_{12}w$ designates the distance between the first lens group and the second lens group at the short focal length extremity; and $fw$ designates the focal length of the entire lens system at the short focal length extremity.

7 Claims, 17 Drawing Sheets

ZOOM LENS SYSTEMS

BACKGROUND OF THE INVENTION

1. Field of the Invention

The present invention relates to a zoom lens system for a compact camera, and in particular, relates to achieving a high zoom ratio, and achieving miniaturization of the zoom lens system.

2. Description of the Related Art

In a zoom lens system for a compact camera, there is no need to provide a long back focal distance, unlike a zoom lens system for a single lens reflex (SLR) camera which requires a space for providing a mirror behind the photographing lens system. Accordingly, a compact camera generally employs a telephoto-type lens system in which positive and negative lens groups are provided in this order from the object, while a SLR camera generally employs a retrofocus type lens system in which negative and positive lens groups are provided in this order from the object.

In recent years, there have been increasing demands for further miniaturization and a higher zoom ratio in zoom lens systems for compact cameras. In order to satisfy the demands for miniaturization, it is preferable to employ a two-lens-group zoom lens system having a small number of lens elements. However, if an attempt is made to obtain a zoom ratio of more than 3.5, a three-lens-group zoom lens system has to be used because a two-lens-group zoom lens system has a limit in obtaining well-balanced aberrations at focal length points in a range determined by the short focal length extremity and the long focal length extremity. However, a conventional three-lens-group zoom lens system is not suitable for miniaturization, since the overall length is longer, and the diameter of the front lens group is larger, compared with a two-lens-group zoom lens system.

SUMMARY OF THE INVENTION

It is an object of the present invention to provide a three-lens-group zoom lens system of a telephoto type, which attains a zoom ratio (i.e., the focal length at the long focal length extremity/the focal length at the short focal length extremity) of about 3.5 to 4 and whose overall length and diameter of the most object-side lens element are short and small enough to the extent that the same are equivalent to those of a two-lens-group zoom lens system.

In order to achieve the above mentioned object, there is provided a zoom lens system including a negative first lens group, a positive second lens group, and a negative third lens group, in this order form the object, and whereby zooming is performed by moving the first through third lens groups along the optical axis. Further, the zoom lens system satisfies the following condition:

$$0.05 < d_{12W}/f_W < 0.35 \quad (1)$$

wherein $d_{12W}$ designates the distance between the first lens group and the second lens group at the short focal length extremity; and $f_W$ designates the focal length of the entire lens system at the short focal length extremity.

The zoom lens system preferably satisfies the following condition:

$$0 < \log_{10} Z_{12} / \log_{10} Z < 0.15 \quad (2)$$

wherein $Z_{12} = f_{12T}/f_{12W}$;

$Z = f_T/f_W$;

$f_{12T}$ designates the resultant focal length of the first lens group and the second lens group at the long focal length extremity;

$f_{12W}$ designates the resultant focal length of the first lens group and the second lens group at the short focal length extremity; and $f_T$ designates the focal length of the entire lens system at the long focal length extremity.

The zoom lens system preferably satisfies the following condition:

$$4 < f_T/f_{12T} < 6 \quad (3)$$

wherein $f_T$ designates the focal length of the entire lens system at the long focal length extremity; and $f_{12T}$ designates the resultant focal length of the first lens group and the second lens group at the long focal length extremity.

The zoom lens system preferably satisfies the following condition:

$$4 < f_T/|f_{3G}| < 8 \quad (4)$$

wherein $f_{3G}$ designates the focal length of the negative third lens group.

The present disclosure relates to subject matter contained in Japanese patent Application No. Hei-10-368173 (filed on Dec. 24, 1998) which is expressly incorporated herein in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 17:
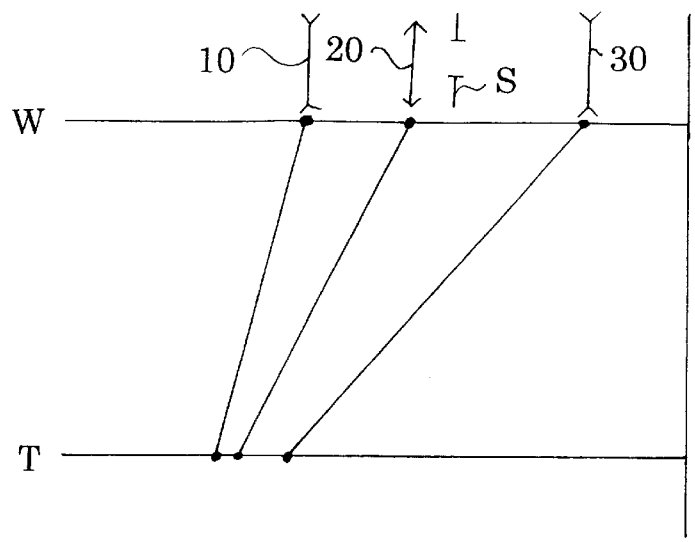
FIG. 17 is the lens-group moving paths of a zoom lens system according to the first embodiment.
Figure 18:
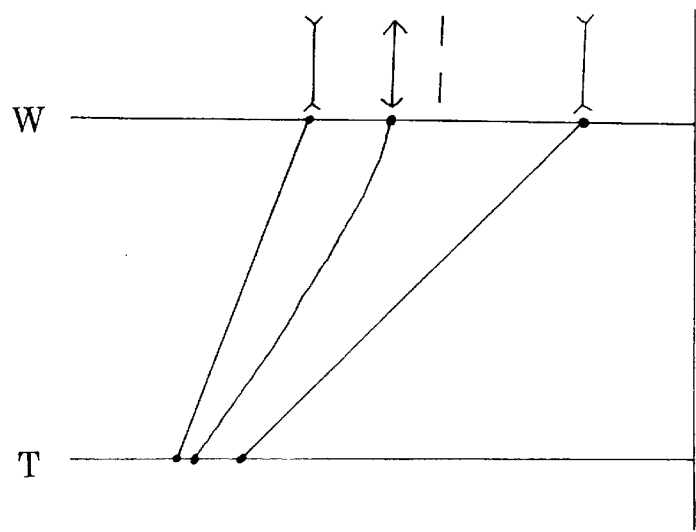
FIG. 18 is the lens-group moving paths of a zoom lens system according to the second and fourth embodiments.
Figure 19:
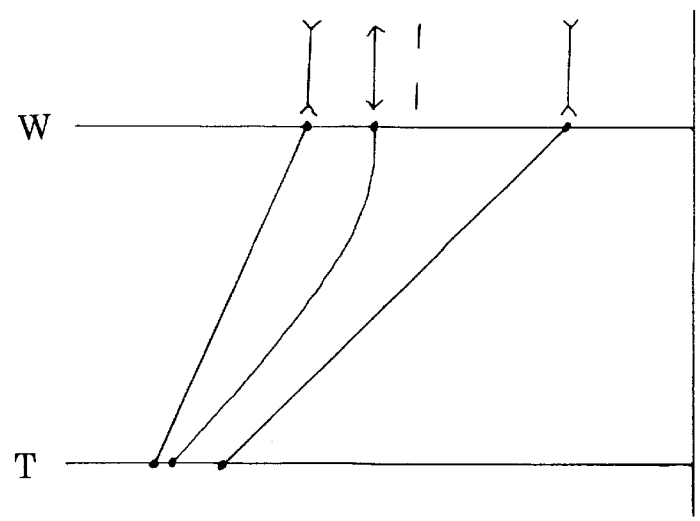
FIG. 19 is the lens-group moving paths of a zoom lens system according to the third embodiment.

As shown in the lens group moving paths of FIGS. 17 18 and 19, the zoom lens system includes a negative first lens group 10, a positive second lens group 20, and a negative third lens group 30, in this order from the object; and zooming is performed by moving the first through third lens groups along the optical axis. More concretely, upon zooming from the short focal length extremity toward the long focal length extremity, the first, second and third lens groups move toward the object, while the distance between the first and second lens groups, and the distance between the second and third lens groups are varied. A diaphragm S is provided between the second lens group 20 and the third lens group 30, and moves integrally with the second lens group 20.

Condition (1) specifies the distance between the negative first lens group 10 and the positive second lens group 20 at the short focal length extremity. By satisfying this condition, the overall length of the zoom lens system at the short focal length extremity can be reduced, and the diameter of the most object-side lens element in the front lens group (first lens group 10) can be made small, and thereby miniaturization of the zoom lens system can be achieved.

If $d_{12}/fw$ exceeds the upper limit of condition (1), the negative first lens group 10 has to be advanced forwardly, and as a result, the diameter of the most object-side lens element increases in order to secure peripheral illumination at the short focal length extremity.

If $d_{12W}/fw$ exceeds the lower limit of condition (1), the distance between the negative first lens group 10 and the positive second lens group 20 becomes too short, which makes an optical arrangement of a zoom lens system impractical.

Condition (2) specifies the resultant focal length of the first lens group 10 and the second lens group 20. By satisfying this condition, an amount of change in the distance upon zooming between the first lens group 10 and the second lens group 20 can be reduced, and thereby miniaturization of the zoom lens system can be achieved.

If $\log_{10}Z_{12}/\log_{10}Z$ exceeds the upper limit of condition (2), an amount of change in the distance between the first lens group 10 and the second lens group 20 increases, so that miniaturization of the zoom lens system cannot be achieved.

If $\log_{10}Z_{12}/\log_{10}Z$ exceeds the lower limit of condition (2), an arrangement of a three-lens-group zoom lens system becomes impossible.

In a three-lens-group zoom lens system, where the first lens group 10 and the second lens group 20 are considered as a positive front lens group, and the third lens group 30 is considered as a negative rear lens group, by suitably balancing the power of the front and rear lens groups, the traveling distance of the positive front lens group and the negative rear lens group can be reduced, and thereby miniaturization of the zoom lens system can be achieved. Conditions (3) and (4) are obtained from the above configuration.

Condition (3) specifies the resultant focal length of the negative first lens group 10 and the positive second lens group 20. By satisfying this condition, the traveling distances of the first and second lens groups can be reduced, and as a result, miniaturization of the zoom lens system can be achieved.

If $f_T/f_{12T}$ exceeds the upper limit of condition (3), the resultant positive power of the negative first lens group 10 and the positive second lens group 20 becomes too strong, so that aberrations upon zooming are increased.

If $f_T/f_{12T}$ exceeds the lower limit of condition (3), the traveling distances of the negative first lens group 10 and the positive second lens group 20 become longer, so that miniaturization of the zoom lens system cannot be achieved.

Condition (4) specifies the focal length of the negative third lens group 30. By satisfying this condition, the traveling distance of the negative third lens group 30 is reduced, so that miniaturization of the zoom lens system can be achieved.

If $f_T/|f_{3G}|$ exceeds the upper limit of condition (4), the power of the negative third lens group 30 becomes too strong, and thereby aberrations upon zooming are increased.

If $f_T/|f_{3G}|$ exceeds the lower limit of condition (4), the traveling distance of the negative third lens group 30 becomes longer, so that miniaturization of the zoom lens system cannot be achieved.

Specific numerical examples will herein be discussed. In the diagrams of chromatic aberration (axial chromatic aberration) represented by spherical aberration, the solid lines and the two types of dotted lines respectively indicate spherical aberration with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables, $F_{NO}$ designates the F-number, f designates the focal length of the entire lens system, W designates the half angle-of-view (°), $f_B$ designates the back focal distance, R designates the radius of curvature, D designates the lens thickness or space between lens surfaces, $N_d$ designates the refractive index with respect to the d-line, and ν designates the Abbe number.

In addition to the above, an aspherical surface which is symmetrical with respect to the optical axis is defined as follows:

$x = Ch^2/\{1+[1-(1+K)C^2h^2]^{1/2}\} + A4h^4 + A6h^6 + A8h^8 + A10h^{10} \ldots$ ;

wherein:
  x designates a distance from a tangent plane of an aspherical vertex;
  C designates a curvature of the aspherical vertex (1/R);
  h designates a distance from the optical axis;

K designates the conic coefficient;
A4 designates a fourth-order aspherical coefficient;
A6 designates a sixth-order aspherical coefficient;
A8 designates a eighth-order aspherical coefficient; and
A10 designates a tenth-order aspherical coefficient;

Embodiment 1

Figure 1:
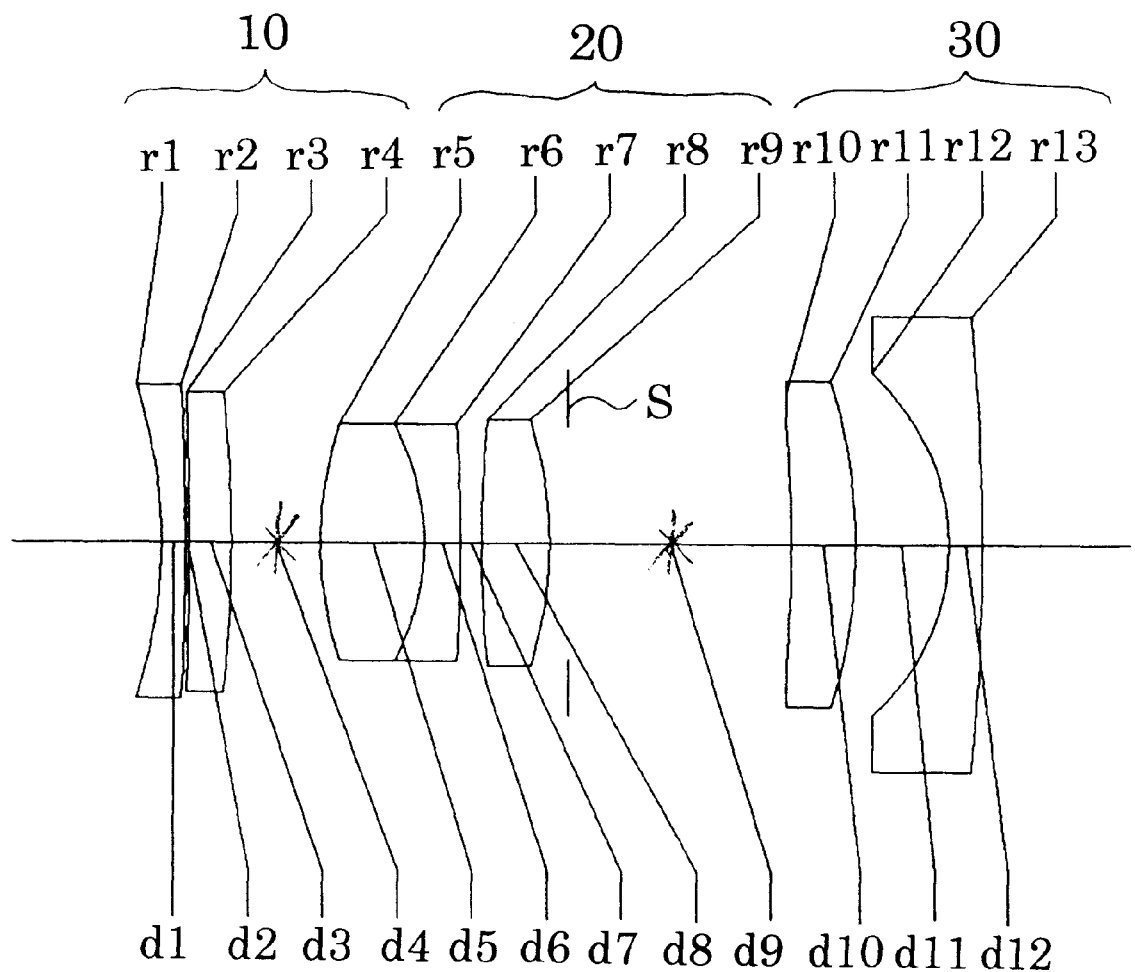
FIG. 1 is a lens arrangement of a first embodiment of a zoom lens system according to the present invention.
Figure 2:
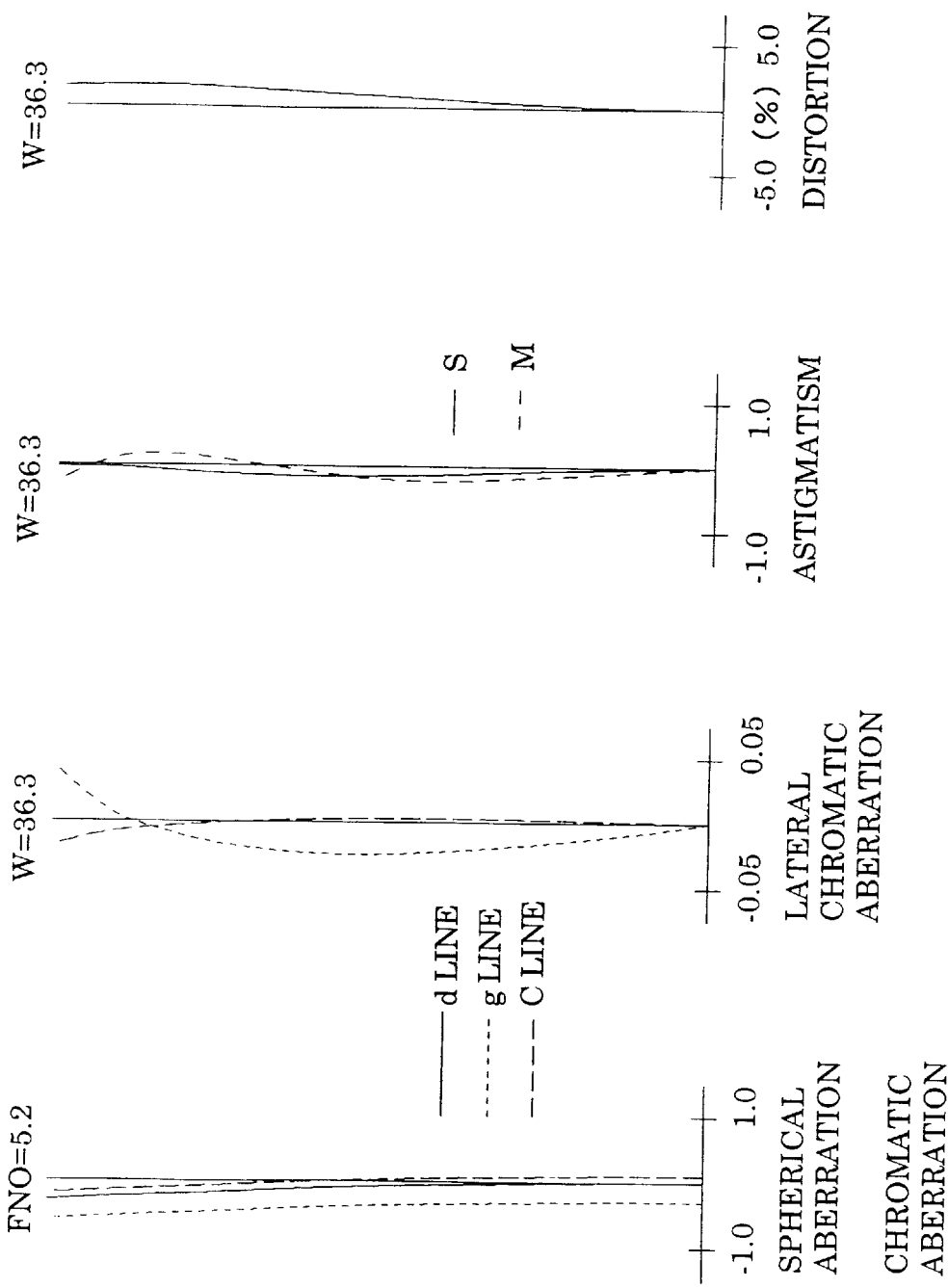
FIGS. 2A, 2B, 2C and 2D show aberration diagrams of the lens arrangement of FIG. 1 at the short focal length extremity.
Figure 3:
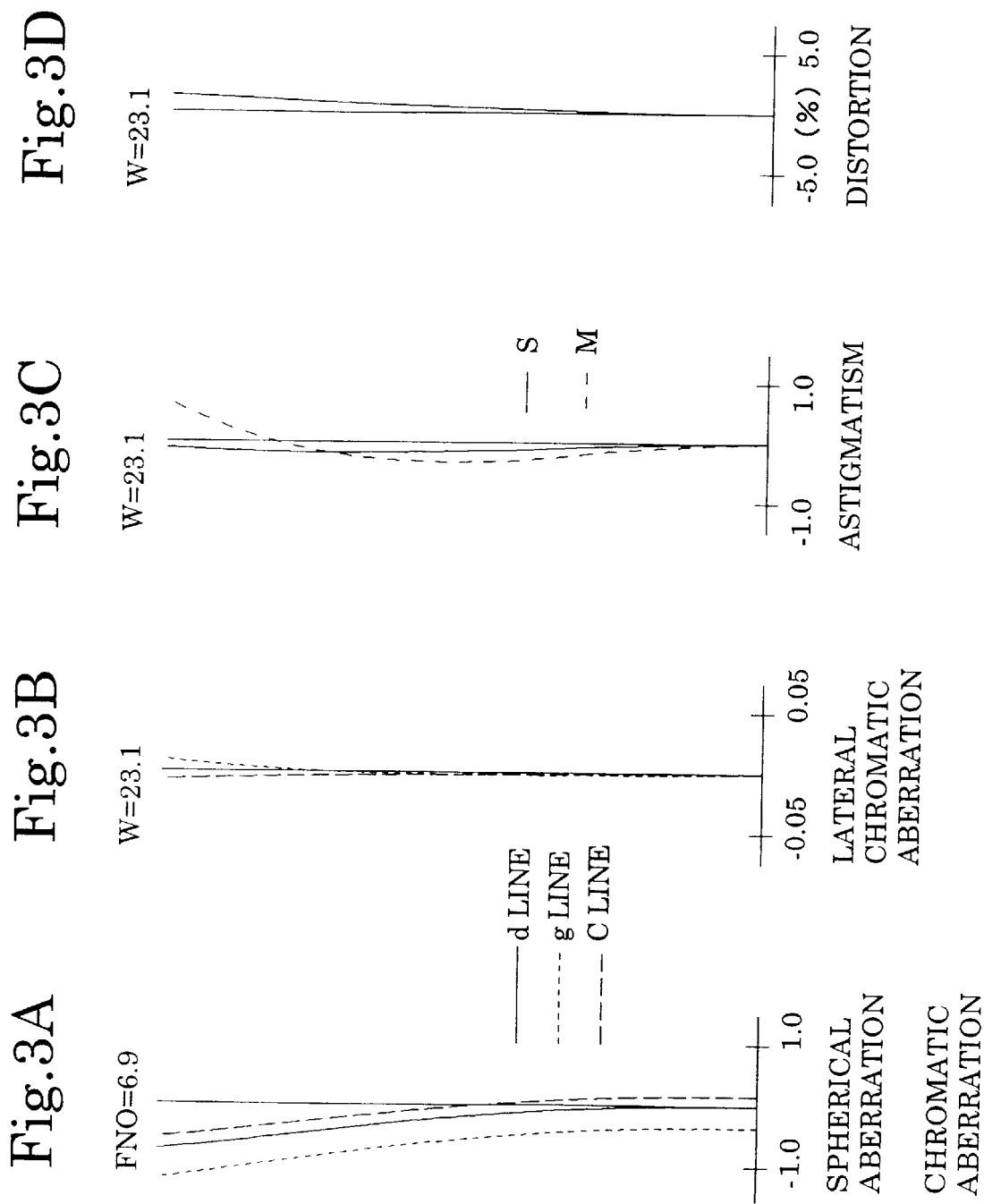
FIGS. 3A, 3B, 3C and 3D show aberration diagrams of the lens arrangement of FIG. 1 at an intermediate focal length.
Figure 4:
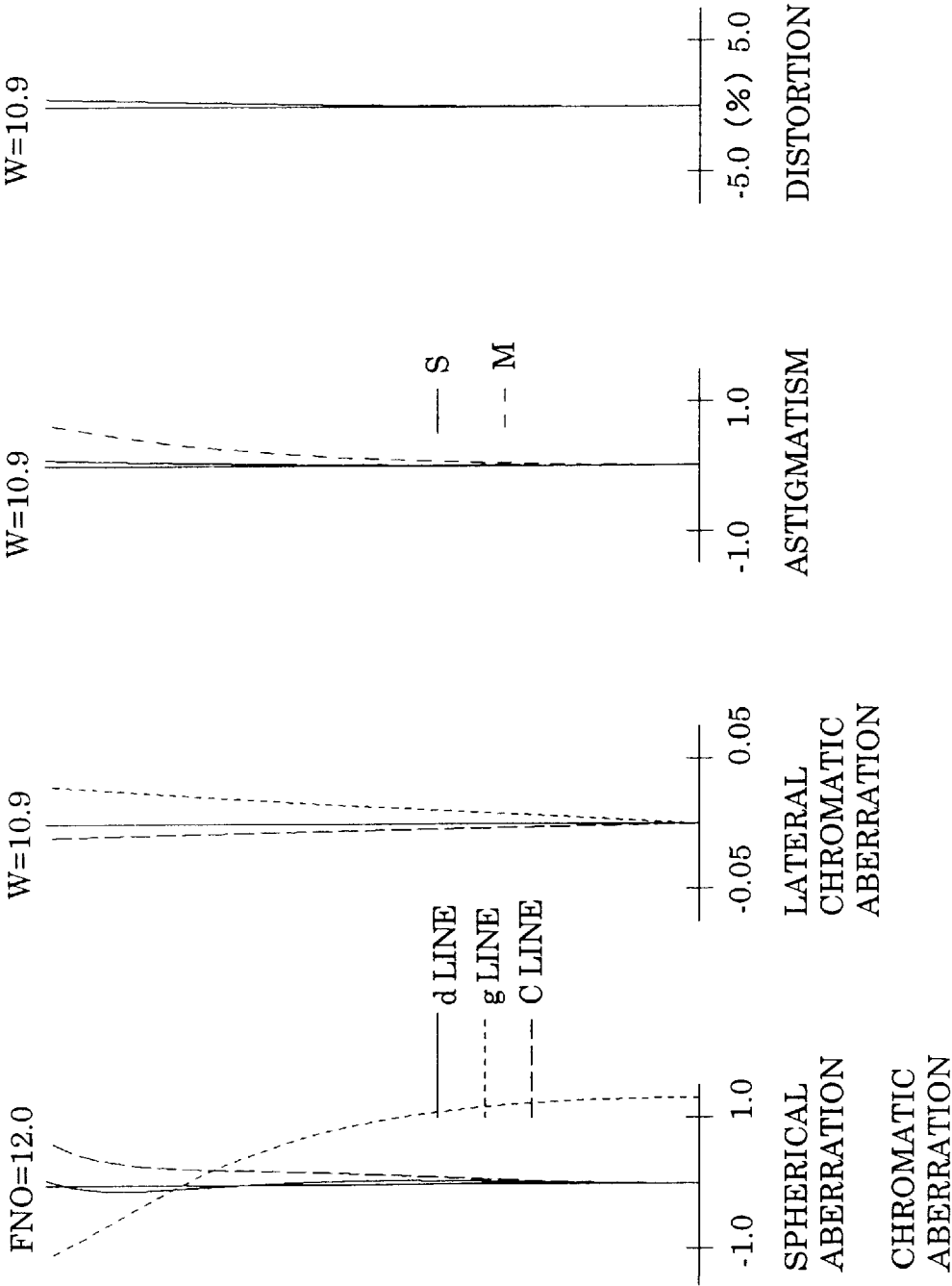
FIGS. 4A, 4B, 4C and 4D show aberration diagrams of the lens arrangement of FIG. 1 at the long focal length extremity.

FIG. 1 is a lens arrangement of the first embodiment of the zoom lens system. FIGS. 2A through 2D, FIGS. 3A through 3D, and FIGS. 4A through 4D show aberration diagrams of the lens arrangement of FIG. 1 respectively at the short focal length extremity, an intermediate focal length, and the long focal length extremity. Table 1 shows the numerical data thereof. Surface Nos. 1 through 4 designate the negative first lens group 10, surface Nos. 5 through 9 designate the positive second lens group 20, and surface Nos. 10 through 13 designate the negative third lens group 30. The first lens group 10 includes a negative lens element and a positive lens element, in this order from the object. The second lens group 20 includes a cemented sub lens group having a positive lens element and a negative lens element, and a positive lens element, in this order from the object. The third lens group 30 includes a positive lens element and a negative lens element, in this order from the object. In FIG. 17, the lens-group moving paths of the zoom lens system according to the first embodiment are shown.

TABLE 1

$F_{NO}$ = 1:5.2–6.9–12.0
f = 29.00–50.00–112.00 (Zoom Ratio: 3.86)
W = 36.3–23.1–10.9
$f_B$ = 8.68–26.16–73.80

| Surface No. | R | D | Nd | V |
|---|---|---|---|---|
| 1 | −20.254 | 1.00 | 1.78908 | 47.7 |
| 2 | −113.479 | 0.17 | — | — |
| 3 | −132.557 | 1.75 | 1.71567 | 28.8 |
| 4 | −56.804 | 3.73–2.57–0.25 | — | — |
| 5 | 15.941 | 4.35 | 1.48749 | 70.2 |
| 6 | −10.198 | 1.50 | 1.84481 | 35.7 |
| 7 | −90.808 | 0.90 | — | — |
| 8 | 55.452 | 2.83 | 1.73077 | 40.5 |
| 9* | −15.737 | 0.75 | — | — |
| Diaphragm | ∞ | 9.38–5.03–1.99 | — | — |
| 10* | −53.027 | 2.69 | 1.58547 | 29.9 |
| 11 | −22.060 | 3.95 | — | — |
| 12 | −9.350 | 1.40 | 1.80353 | 45.8 |
| 13 | −96.112 | — | — | — |

*designates the aspherical surface which is rotationally symmetrical with respect to the optical axis.

Aspherical surface data (the aspherical surface coefficients not indicated are zero (0.00)):

| Surface | K | A4 | A6 | A8 |
|---|---|---|---|---|
| 9 | 0.00 | $0.6827 \times 10^{-4}$ | $-0.2020 \times 10^{-6}$ | $0.4000 \times 10^{-8}$ |
| 10 | 0.00 | $0.7968 \times 10^{-4}$ | $-0.1527 \times 10^{-6}$ | $0.1273 \times 10^{-7}$ |

[Embodiment 2]

Figure 5:
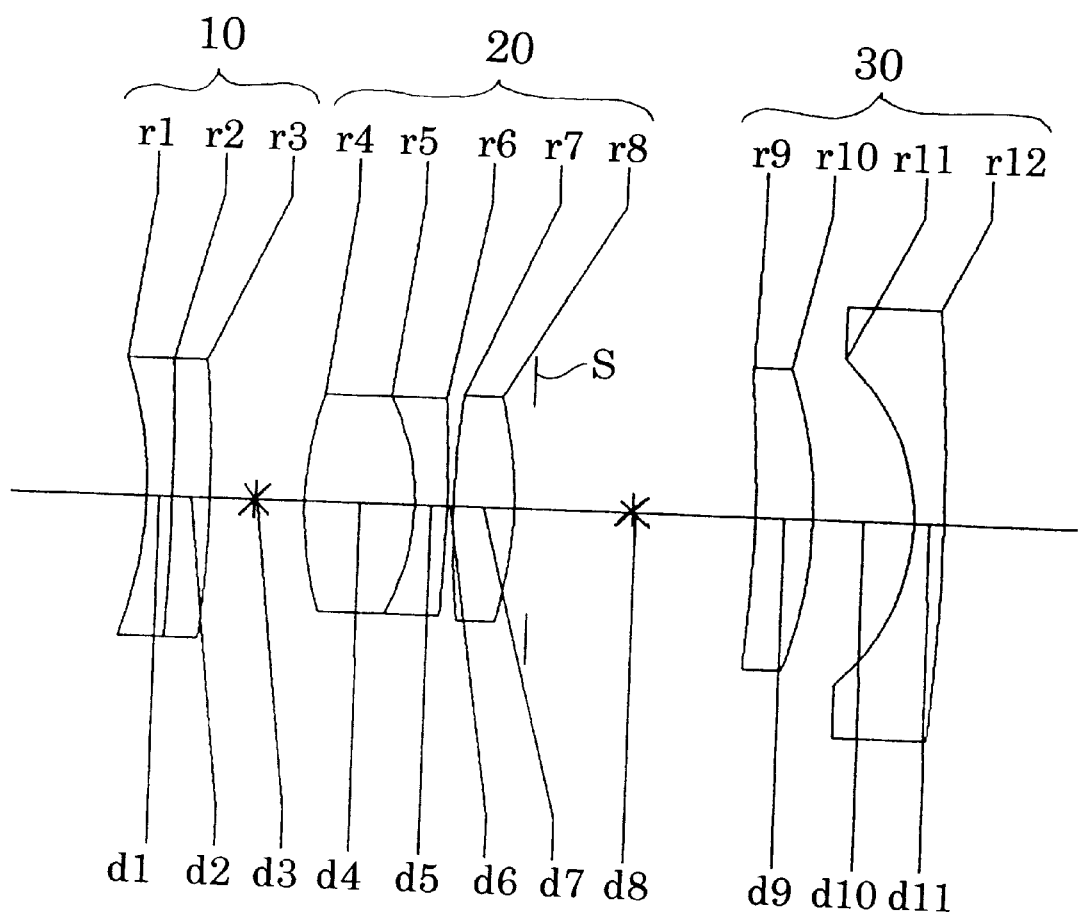
FIG. 5 is a lens arrangement of a second embodiment of a zoom lens system according to the present invention.
Figure 6:
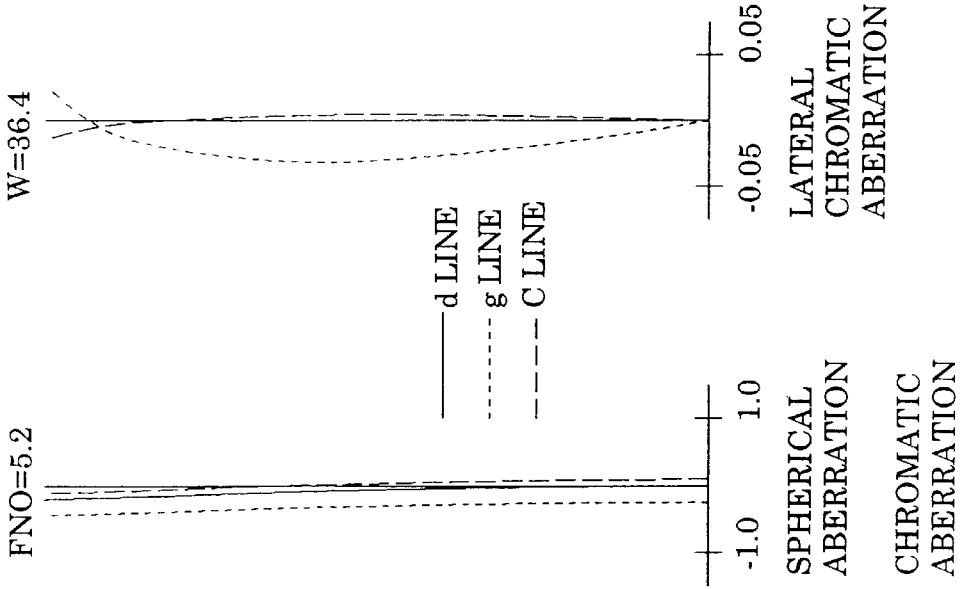
FIGS. 6A, 6B, 6C and 6D show aberration diagrams of the lens arrangement of FIG. 5 at the short focal length extremity.
Figure 7:
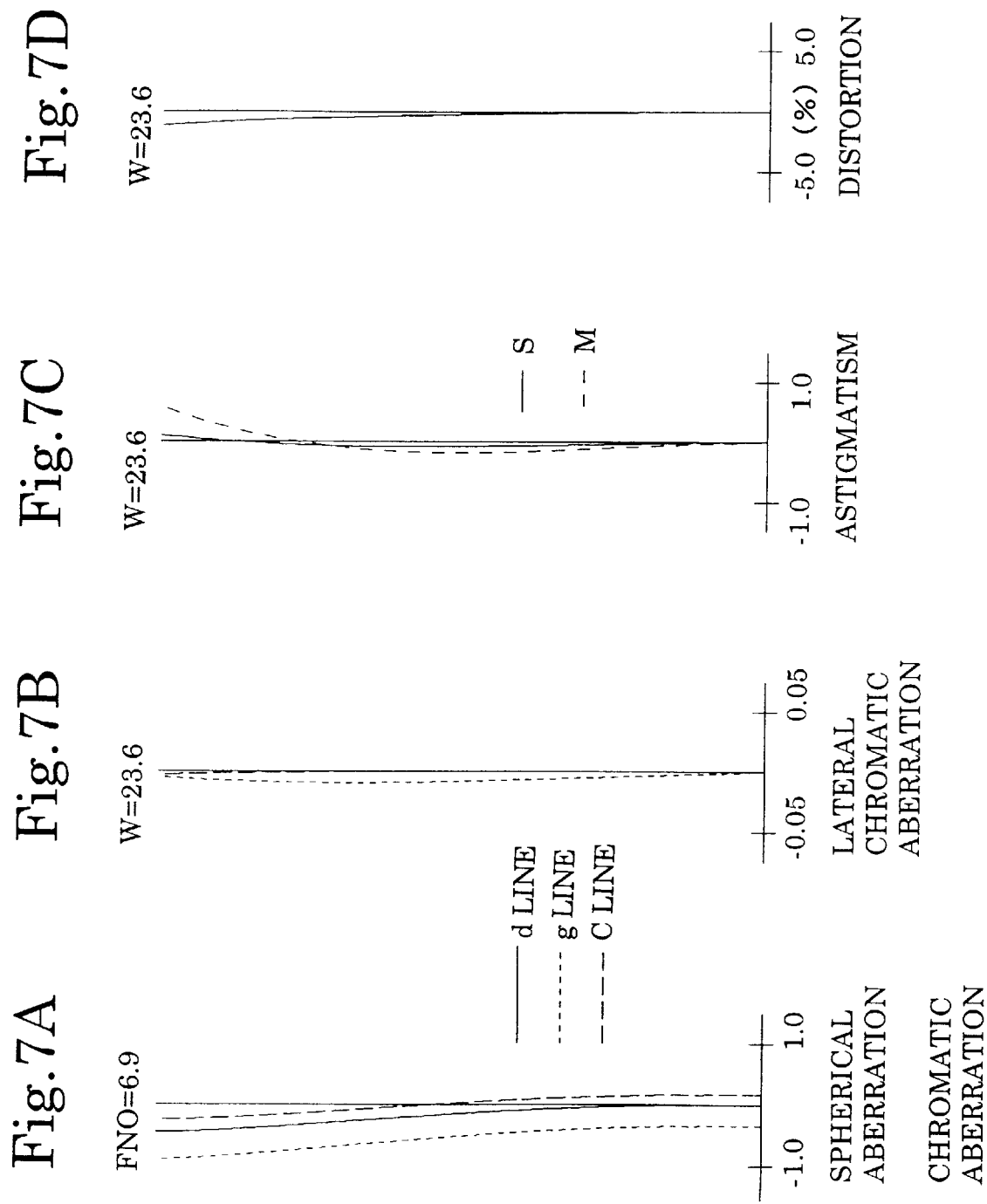
FIGS. 7A, 7B, 7C and 7D show aberration diagrams of the lens arrangement of FIG. 5 at an intermediate focal length.
Figure 8:
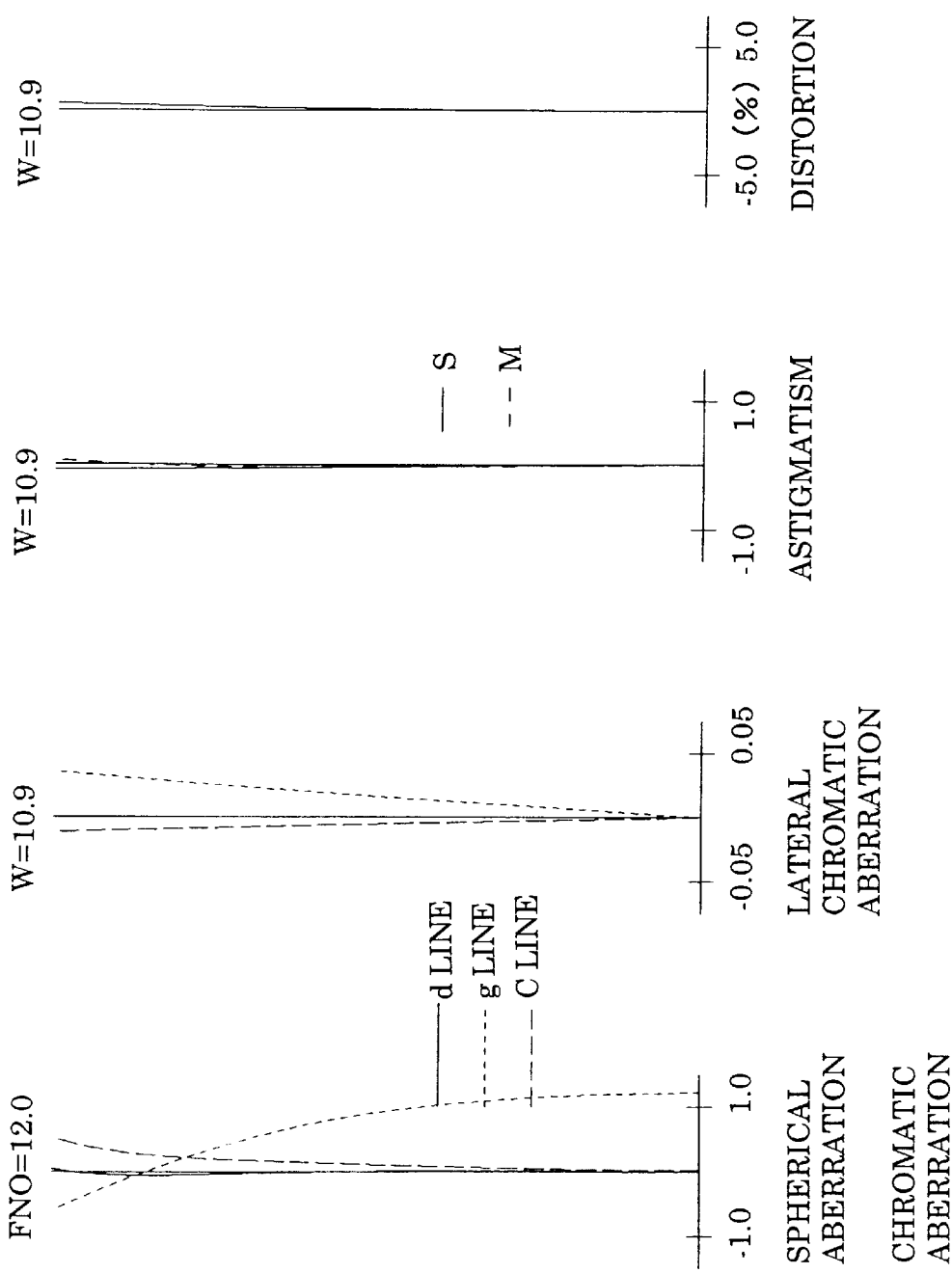
FIGS. 8A, 8B, 8C and 8D show aberration diagrams of the lens arrangement of FIG. 5 at the long focal length extremity.

FIG. 5 is a lens arrangement of the second embodiment of the zoom lens system. FIGS. 6A through 6D, FIGS. 7A through 7D and FIGS. 8A through 8D show aberration diagrams of the lens arrangement of FIG. 5 respectively at the short focal length extremity, an intermediate focal length and the long focal length extremity. Table 2 shows the numerical data thereof. Surface Nos. 1 through 3 designate the negative first lens group 10, surface Nos. 4 through 8 designate the positive second lens group 20, and surface Nos. 9 through 12 designate the negative third lens group 30. The first lens group 10 includes a cemented sub lens group having a negative lens element and a positive lens element, in this order from the object. The second lens group 20 includes a cemented sub lens group having a positive lens element and a negative lens element, and a positive lens element, in this order from the object. The third lens group 30 includes a positive lens element and a negative lens element, in this order from the object. In FIG. 18, the lens-group moving paths of the zoom lens system according to the second embodiment are shown.

TABLE 2

$F_{NO}$ = 1:5.2–6.9–12.0
f = 29.00–50.00–112.00 (Zoom Ratio: 3.86)
W = 36.4–23.6–10.9
$f_B$ = 8.32–28.52–74.49

| Surface No. | R | D | Nd | V |
|---|---|---|---|---|
| 1* | −18.886 | 1.20 | 1.77000 | 50.3 |
| 2 | −123.486 | 1.75 | 1.70719 | 29.2 |
| 3 | −60.439 | 4.38–4.38–0.55 | — | — |
| 4 | 16.324 | 5.18 | 1.48749 | 70.2 |
| 5 | −10.533 | 1.50 | 1.84493 | 35.1 |
| 6 | −69.448 | 0.32 | — | — |
| 7 | 48.921 | 2.83 | 1.73077 | 40.5 |
| 8* | −18.149 | 0.75 | — | — |
| Diaphragm | ∞ | 10.46–4.59–2.05 | — | — |
| 9* | −47.122 | 2.69 | 1.58547 | 29.9 |
| 10 | −21.031 | 4.69 | — | — |
| 11 | −10.077 | 1.40 | 1.78912 | 47.5 |
| 12 | −104.909 | — | — | — |

*designates the aspherical surface which is rotationally symmetrical with respect to the optical axis.

Aspherical surface data (the aspherical surface coefficients not indicated are zero (0.00)):

| Surface | K | A4 | A6 | A8 |
|---|---|---|---|---|
| 1 | 0.00 | $0.8282 \times 10^{-5}$ | $0.6651 \times 10^{-7}$ | — |
| 8 | 0.00 | $0.5770 \times 10^{-4}$ | $-0.1493 \times 10^{-6}$ | $0.1853 \times 10^{-8}$ |
| 9 | 0.00 | $0.4728 \times 10^{-4}$ | $-0.1333 \times 10^{-6}$ | $0.5892 \times 10^{-8}$ |

[Embodiment 3]

Figure 9:
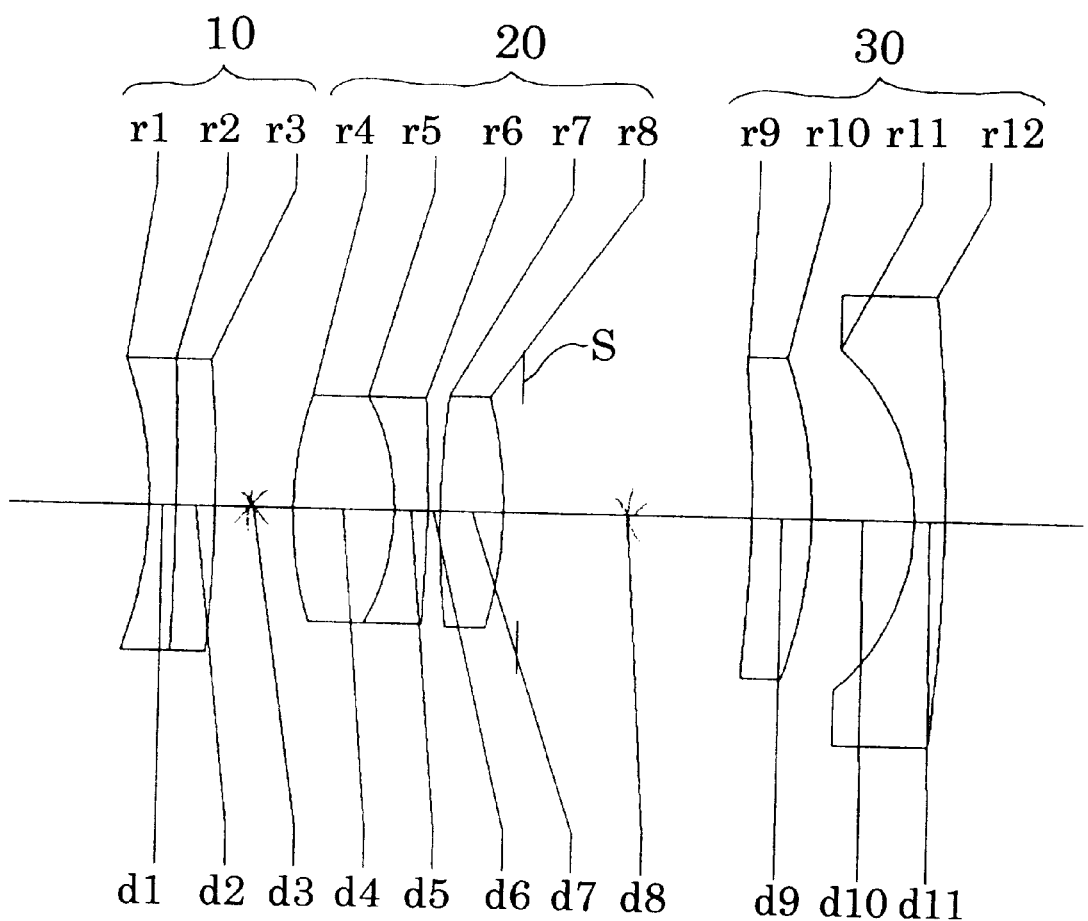
FIG. 9 is a lens arrangement of a third embodiment of a zoom lens system according to the present invention.
Figure 10:
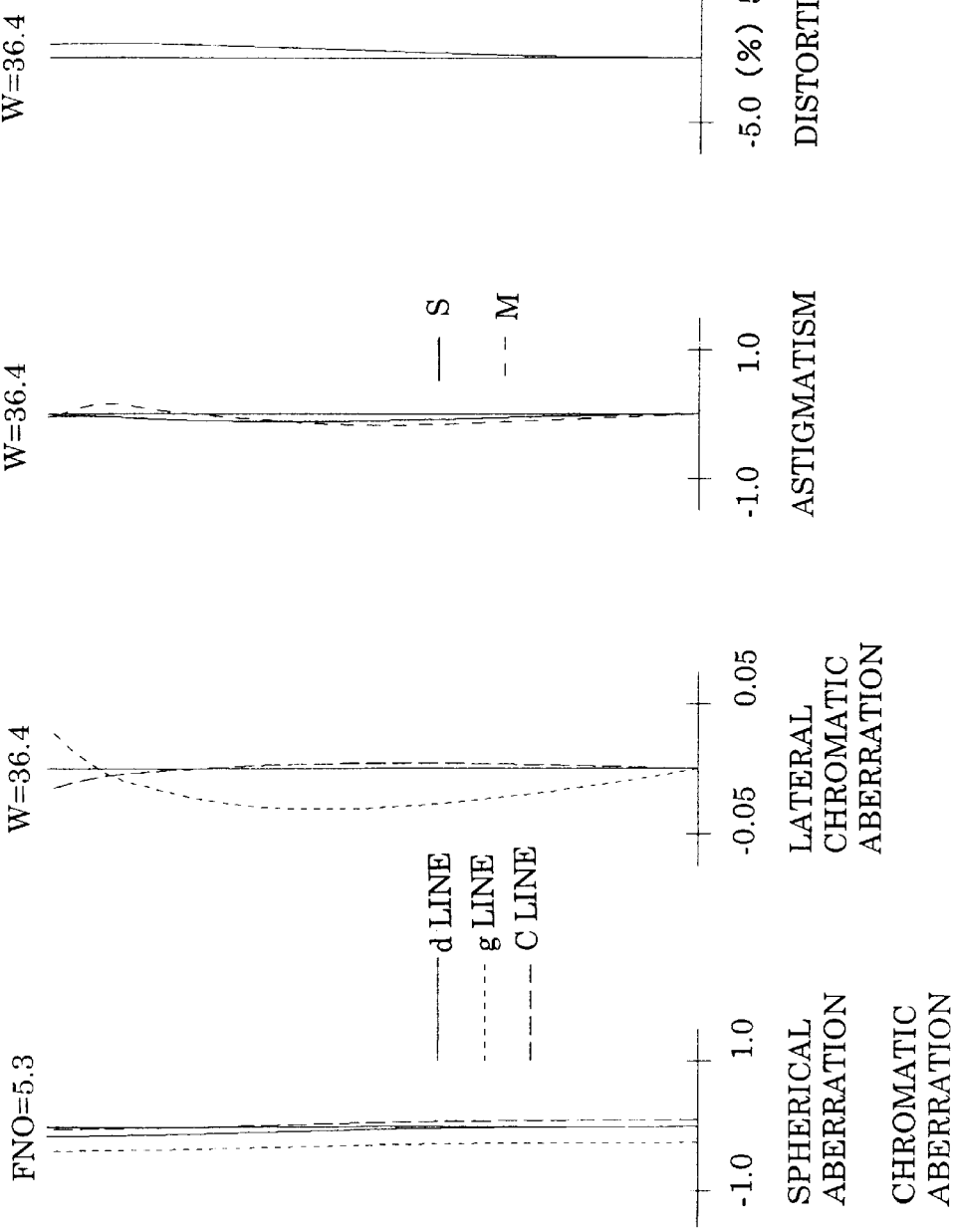
FIGS. 10A, 10B, 10C and 10D show aberration diagrams of the lens arrangement of FIG. 9 at the short focal length extremity.
Figure 11:
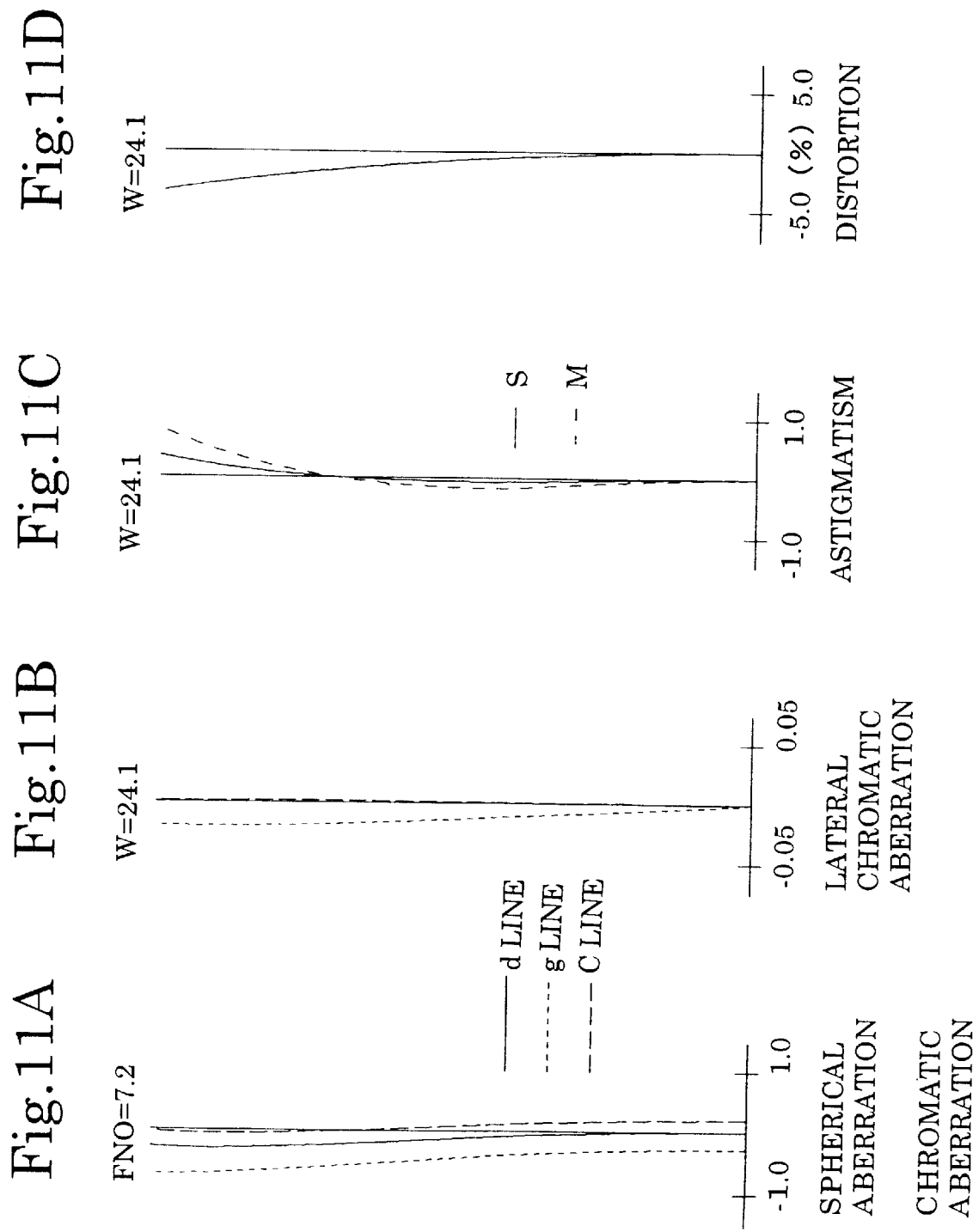
FIGS. 11A, 11B, 11C and 11D show aberration diagrams of the lens arrangement of FIG. 9 at an intermediate focal length.
Figure 12:
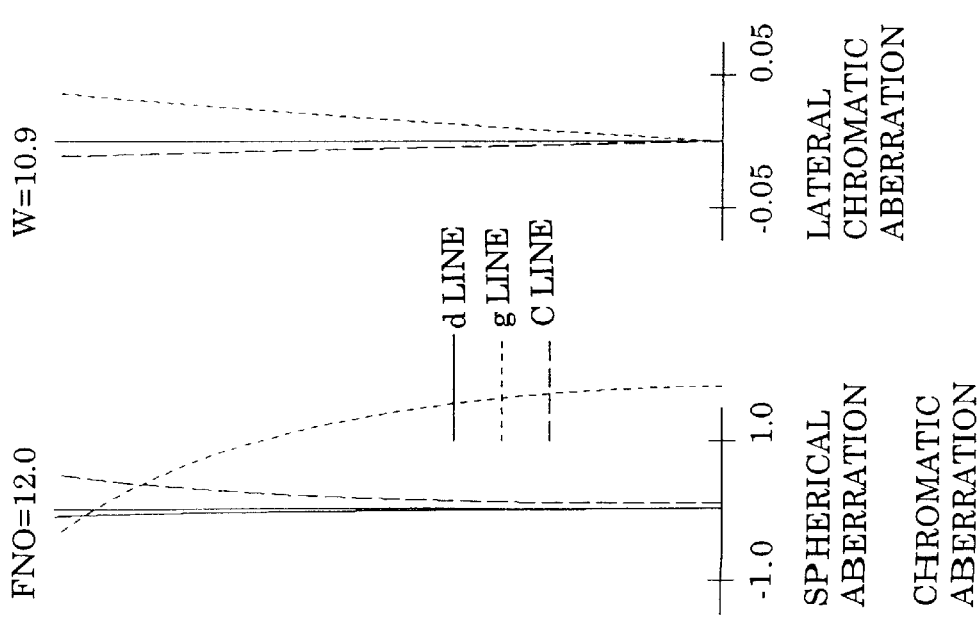
FIGS. 12A, 12B, 12C and 12D show aberration diagrams of the lens arrangement of FIG. 9 at the long focal length extremity.

FIG. 9 is a lens arrangement of the third embodiment of the zoom lens system. FIGS. 10A through 10D, FIGS. 11A through 11D and FIGS. 12A through 12D show aberration diagrams of the lens arrangement of FIG. 9 respectively at the short focal length extremity, an intermediate focal length and the long focal length extremity. Table 3 shows the numerical data thereof. The basic lens arrangement is the same as the second embodiment. In FIG. 19, the lens group moving paths of the zoom lens system according to the third embodiment are shown.

TABLE 3

$F_{NO} = 1:5.3–7.2–12.0$
$f = 29.00–50.00–112.00$ (Zoom Ratio: 3.86)
$W = 36.4–24.1–10.9$
$f_B = 8.31–31.40–75.13$

| Surface No. | R | D | Nd | ν |
|---|---|---|---|---|
| 1* | −18.552 | 1.20 | 1.77000 | 50.2 |
| 2 | −145.550 | 1.75 | 1.72140 | 28.5 |
| 3 | −65.528 | 3.51–5.25–0.25 | — | — |
| 4 | 16.367 | 4.56 | 1.48749 | 70.2 |
| 5 | −10.651 | 1.50 | 1.84499 | 34.6 |
| 6 | −66.271 | 0.58 | — | — |
| 7 | 47.302 | 2.83 | 1.73077 | 40.5 |
| 8* | −17.949 | 0.75 | — | — |
| Diaphragm | ∞ | 10.46–3.59–2.03 | — | — |
| 9* | −48.690 | 2.69 | 1.58547 | 29.9 |
| 10 | −21.317 | 4.65 | — | — |
| 11 | −9.968 | 1.40 | 1.80133 | 46.0 |
| 12 | −88.559 | — | — | — |

*designates the aspherical surface which is rotationally symmetrical with respect to the optical axis.

Aspherical surface data (the aspherical surface coefficients not indicated are zero (0.00)):

| Surface | K | A4 | A6 | A8 |
|---|---|---|---|---|
| 1 | 0.00 | $0.7095 \times 10^{-5}$ | $0.7422 \times 10^{-7}$ | — |
| 8 | 0.00 | $0.6396 \times 10^{-4}$ | $-0.7571 \times 10^{-7}$ | $0.9337 \times 10^{-9}$ |
| 9 | 0.00 | $0.5483 \times 10^{-4}$ | $-0.3621 \times 10^{-7}$ | $0.4952 \times 10^{-8}$ |

[Embodiment 4]

Figure 13:
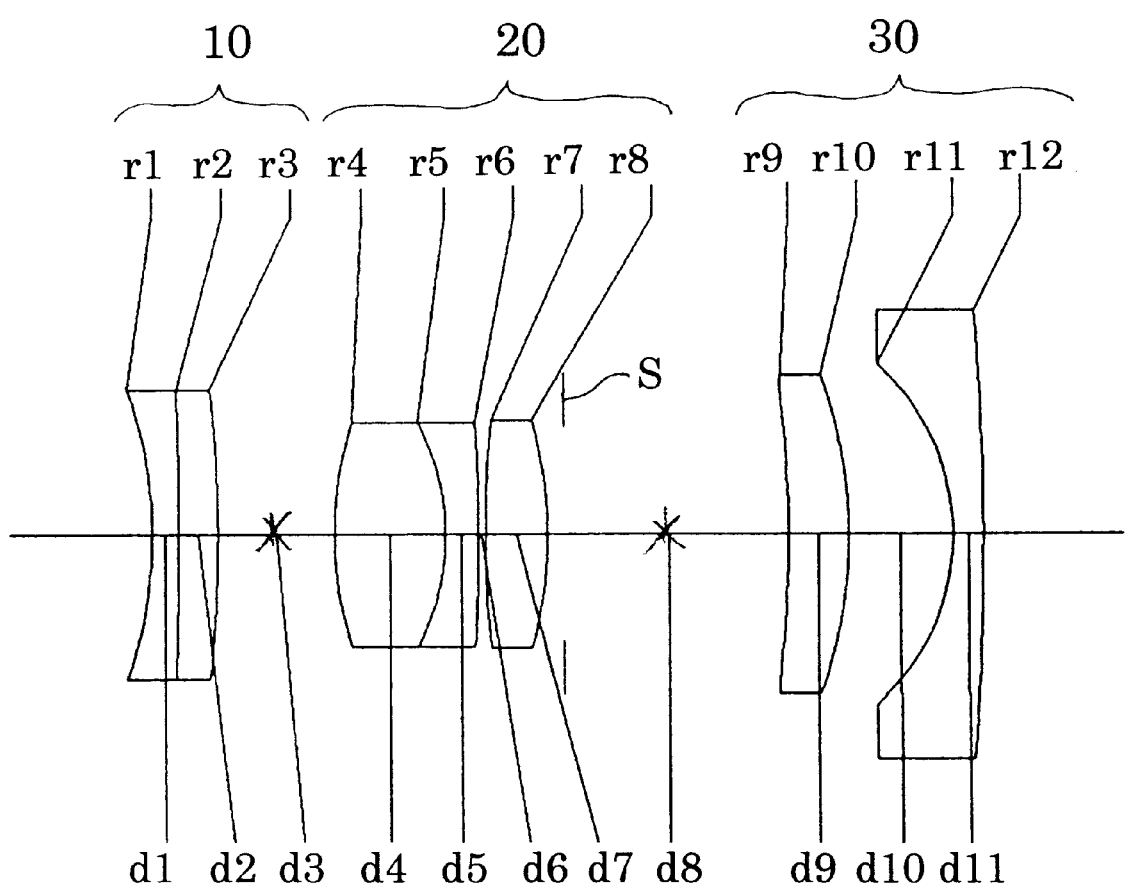
FIG. 13 is a lens arrangement of a fourth embodiment of a zoom lens system according to the present invention.
Figure 14:
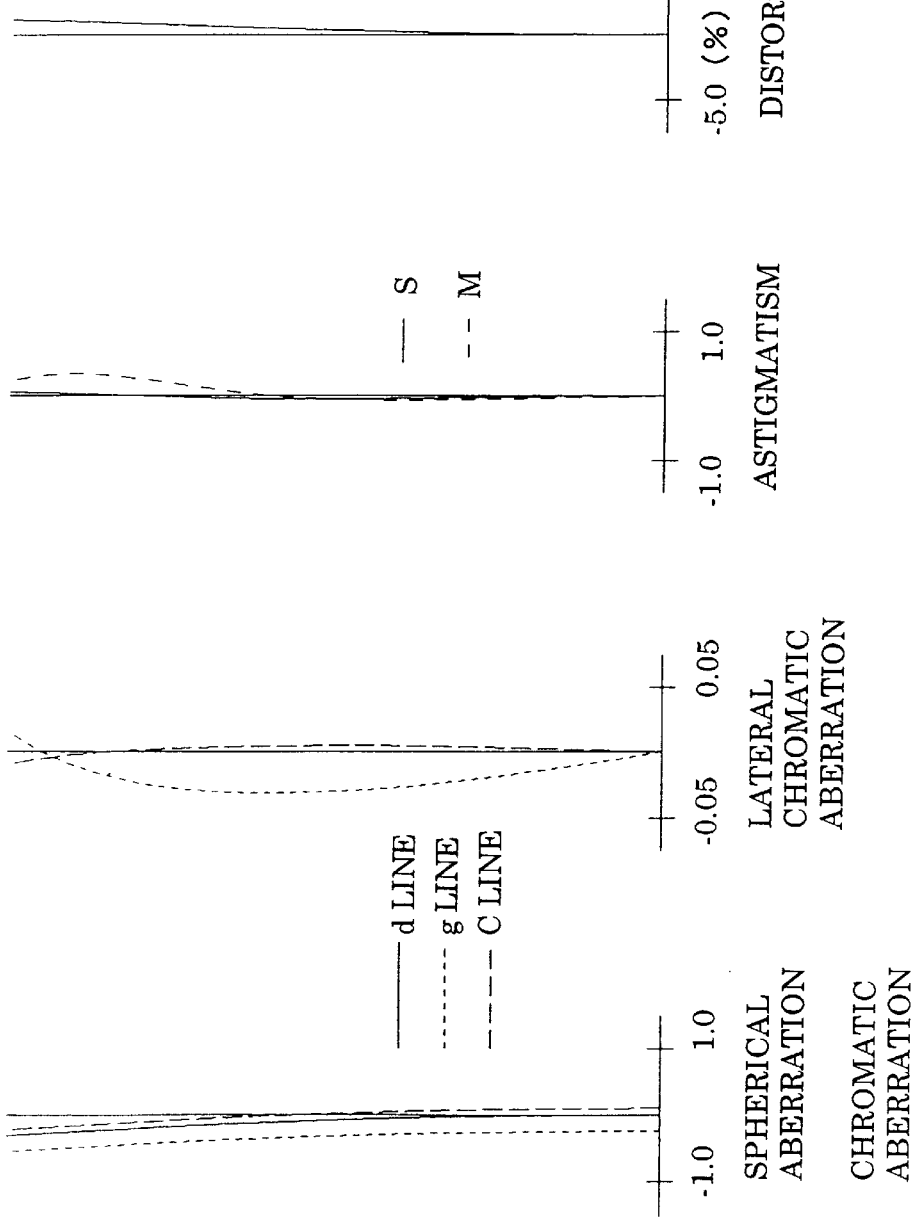
FIGS. 14A, 14B, 14C and 14D show aberration diagrams of the lens arrangement of FIG. 13 at the short focal length extremity.
Figure 15:
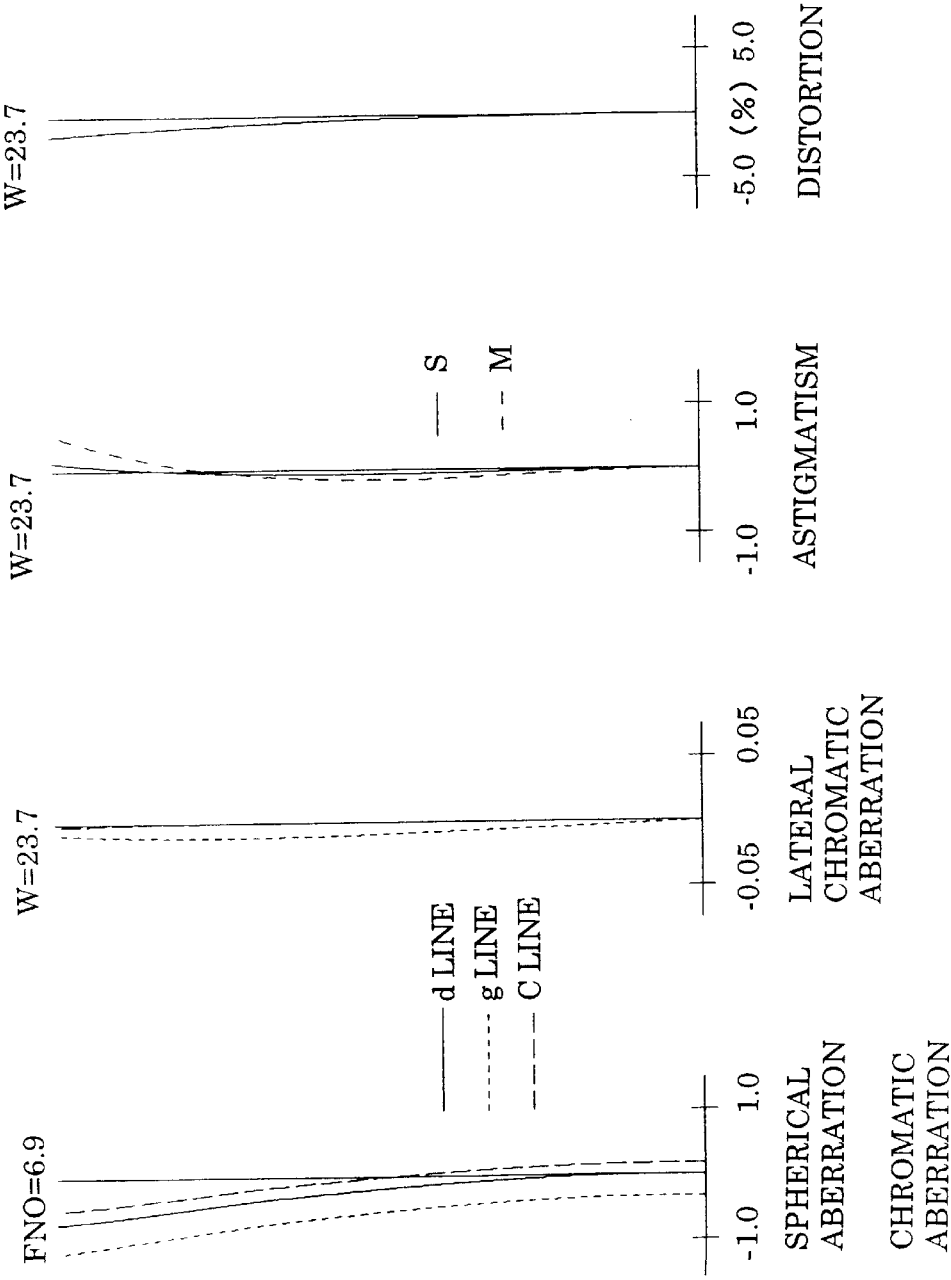
FIGS. 15A, 15B, 15C and 15D show aberration diagrams of the lens arrangement of FIG. 13 at an intermediate focal length.
Figure 16:
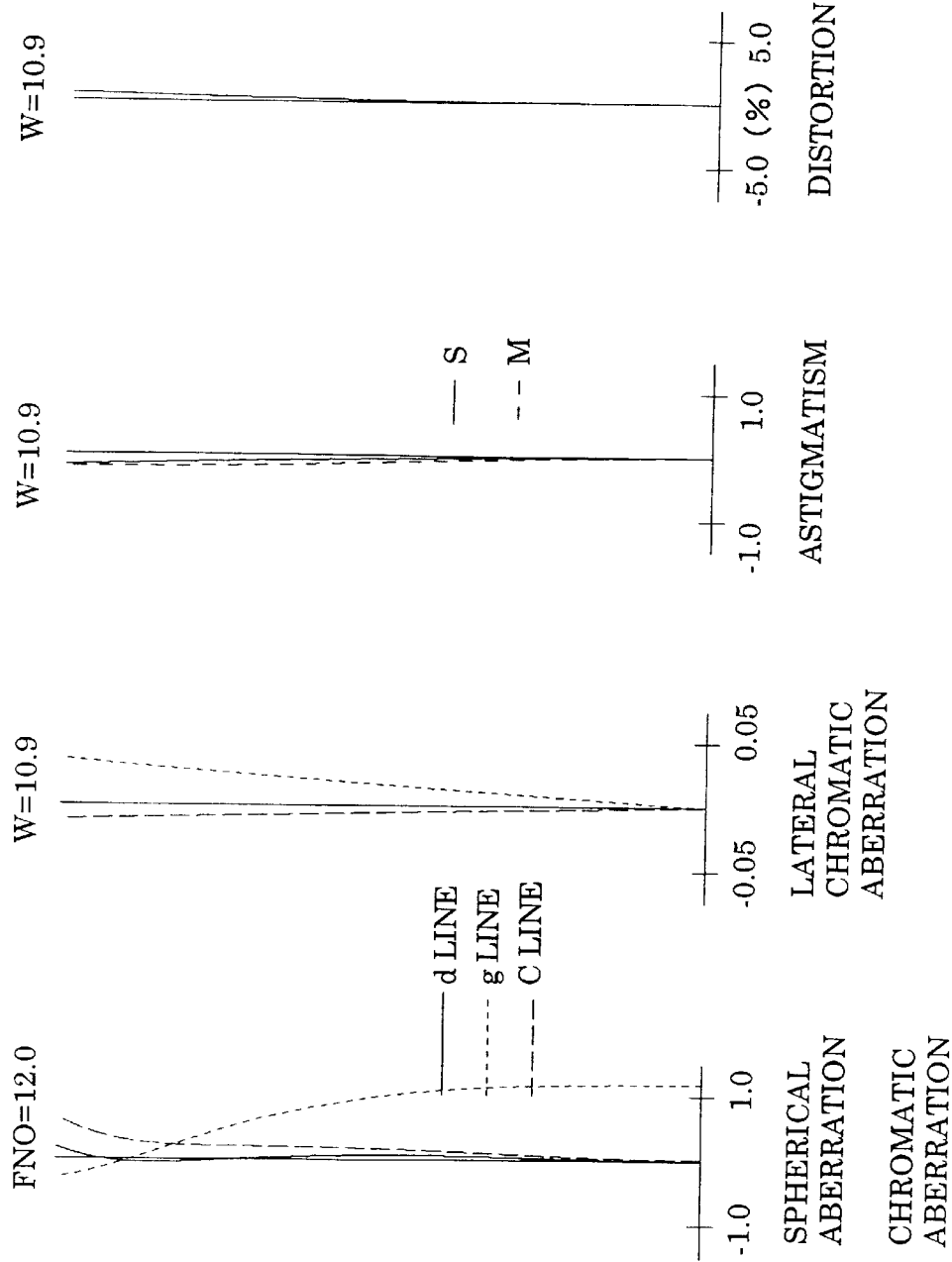
FIGS. 16A, 16B, 16C and 16D show aberration diagrams of the lens arrangement of FIG. 13 at the long focal length extremity.

FIG. 13 is a lens arrangement of the fourth embodiment of the zoom lens system. FIGS. 14A through 14D, FIGS. 15A through 15D and FIGS. 16A through 16D show aberration diagrams of the lens arrangement of FIG. 13 respectively at the short focal length extremity, an intermediate focal length and the long focal length extremity. Table 4 shows the numerical data thereof. The basic lens arrangement is the same as the second embodiment. In FIG. 18, the lens-group moving paths of the zoom lens system according to the fourth embodiment are shown.

TABLE 4

$F_{NO} = 1:5.2–6.9–12.0$
$f = 29.00–50.00–112.00$ (Zoom Ratio: 3.86)
$W = 36.4–23.7–10.9$
$f_B = 8.62–29.10–74.04$

| Surface No. | R | D | Nd | ν |
|---|---|---|---|---|
| 1* | −19.455 | 1.20 | 1.77082 | 50.1 |
| 2 | −150.393 | 1.75 | 1.70294 | 29.3 |
| 3 | −60.304 | 5.20–5.26–0.73 | — | — |
| 4 | 16.257 | 5.00 | 1.48749 | 70.2 |
| 5 | −10.402 | 1.50 | 1.84500 | 55.1 |
| 6 | −71.269 | 0.30 | — | — |
| 7 | 49.720 | 2.83 | 1.73077 | 40.5 |
| 8* | −18.240 | 0.75 | — | — |
| Diaphragm | ∞ | 10.19–4.35–2.06 | — | — |
| 9* | −46.596 | 2.69 | 1.58547 | 29.9 |
| 10 | −20.932 | 4.74 | — | — |
| 11 | −10.149 | 1.40 | 1.78440 | 48.0 |
| 12 | −121.513 | — | — | — |

*designates the aspherical surface which is rotationally symmetrical with respect to the optical axis.

Aspherical surface data (the aspherical surface coefficients not indicated are zero (0.00)):

| Surface | K | A4 | A6 | A8 |
|---|---|---|---|---|
| 1 | 0.00 | $0.7341 \times 10^{-5}$ | $0.7306 \times 10^{-7}$ | — |
| 8 | 0.00 | $0.5051 \times 10^{-4}$ | $-0.1980 \times 10^{-6}$ | $0.2653 \times 10^{-8}$ |
| 9 | 0.00 | $0.3781 \times 10^{-4}$ | $-0.2031 \times 10^{-6}$ | $0.6358 \times 10^{-8}$ |

Table 5 shows the numerical values of each condition for each embodiment.

TABLE 5

|  | Embod. (1) | Embod. (2) | Embod. (3) | Embod. (4) |
|---|---|---|---|---|
| Cond. (1) | 0.13 | 0.15 | 0.12 | 0.18 |
| Cond. (2) | 0.077 | 0.090 | 0.090 | 0.110 |
| Cond. (3) | 5.27 | 4.76 | 4.83 | 4.74 |
| Cond. (4) | 6.46 | 5.67 | 5.72 | 5.68 |

As can be understood from Table 5, each embodiment satisfies each condition, and as can be understood from the aberration diagrams, aberrations are adequately corrected.

According to the above description, a three-lens-group zoom lens system of a telephoto type can attain a zoom ratio of about 3.5 to 4. Furthermore, in the three-lens-group zoom lens system of a telephoto type, the overall length and the diameter of the most object-side lens element are short and small enough to the extent that the same are equivalent to those of a two-lens-group zoom lens system.

What is claimed is:

1. A zoom lens system comprising a negative first lens group, a positive second lens group, and a negative third lens group, in this order from an object, wherein zooming is performed by moving said first through third lens groups along the optical axis of said zoom lens system; and wherein said zoom lens system satisfies the following condition:

$0.05 < d_{12W}/f_W \leq 0.18$ wherein $d_{12W}$ designates the distance between said first lens group and said second lens group at the short focal length extremity; and $f_W$ designates the focal length of the entire lens system at the short focal length extremity.

2. The zoom lens system according to claim 1, wherein said zoom lens system satisfies the following condition:

$4 < f_T/|f_{3G}| < 8$ wherein $f_{3G}$ designates the focal length of said third lens group; and $f_T$ designates the focal length of the entire lens system at the long focal length extremity.

3. A zoom lens system comprising a negative first lens group, a positive second lens group, and a negative third lens group, in this order from an object, wherein zooming is performed by moving said first through third lens groups along the optical axis of said zoom lens system; and wherein said zoom lens system satisfies the following conditions:

$$0.05 < d_{12W}/f_W < 0.35$$

$$0 < \log_{10} Z_{12}/\log_{10} Z < 0.15$$

wherein
- $d_{12W}$ designates the distance between said first lens group and said second lens group at the short focal length extremity;
- $f_W$ designates the focal length of the entire lens system at the short focal length extremity;

$$Z_{12} = f_{12T}/f_{12W};$$

$$Z = f_T/f_W;$$

- $f_{12T}$ designates the resultant focal length of said first lens group and said second lens group at the long focal length extremity;
- $f_{12W}$ designates the resultant focal length of said first lens group and said second lens group at the short focal length extremity; and
- $f_T$ designates the focal length of the entire lens system at the long focal length extremity.

4. The zoom lens system according to claim 3, wherein said zoom lens system satisfies the following condition:

$$4 < f_T/|f_{3G}| < 8$$

wherein
- $f_{3G}$ designates the focal length of said third lens group; and
- $f_T$ designates the focal length of the entire lens system at the long focal length extremity.

5. A zoom lens system comprising a negative first lens group, a positive second lens group, and a negative third lens group, in this order from an object,
- wherein zooming is performed by moving said first through third lens groups along the optical axis of said zoom lens system; and
- wherein said zoom lens system satisfies the following conditions:

$$0.05 < d_{12W}/f_W < 0.35$$

$$4 < f_T/f_{12T} < 6$$

wherein
- $d_{12W}$ designates the distance between said first lens group and said second lens group at the short focal length extremity;
- $f_W$ designates the focal length of the entire lens system at the short focal length extremity;
- $f_T$ designates the focal length of the entire lens system at the long focal length extremity; and
- $f_{12T}$ designates the resultant focal length of said first lens group and said second lens group at the long focal length extremity.

6. The zoom lens system according to claim 5, wherein said zoom lens system satisfies the following condition:

$$4 < f_T/|f_{3G}| < 8$$

wherein
- $f_{3G}$ designates the focal length of said third lens group; and
- $f_T$ designates the focal length of the entire lens system at the long focal length extremity.

7. A zoom lens system consisting essentially of, in order from an object, a negative first lens group, a positive second lens group, and a negative third lens group which are moved with respect to one another during zooming,
- wherein zooming is performed by moving said first through third lens groups along the optical axis of said zoom lens system; and
- wherein said zoom lens system satisfies the following conditions:

$$0.05 < d_{12W}/f_W < 0.35$$

$$4 < f_T/|f_{3G}| < 8$$

wherein
- $d_{12W}$ designates the distance between said first lens group and said second lens group at the short focal length extremity; and
- $f_W$ designates the focal length of the entire lens system at the short focal length extremity
- $f_{3G}$ designates the focal length of said third lens group; and
- $f_T$ designates the focal length of the entire lens system at the long focal length extremity.

* * * * *